Aug. 24, 1937. C. C. HARRIS Re. 20,481
PENCIL
Original Filed April 13, 1933
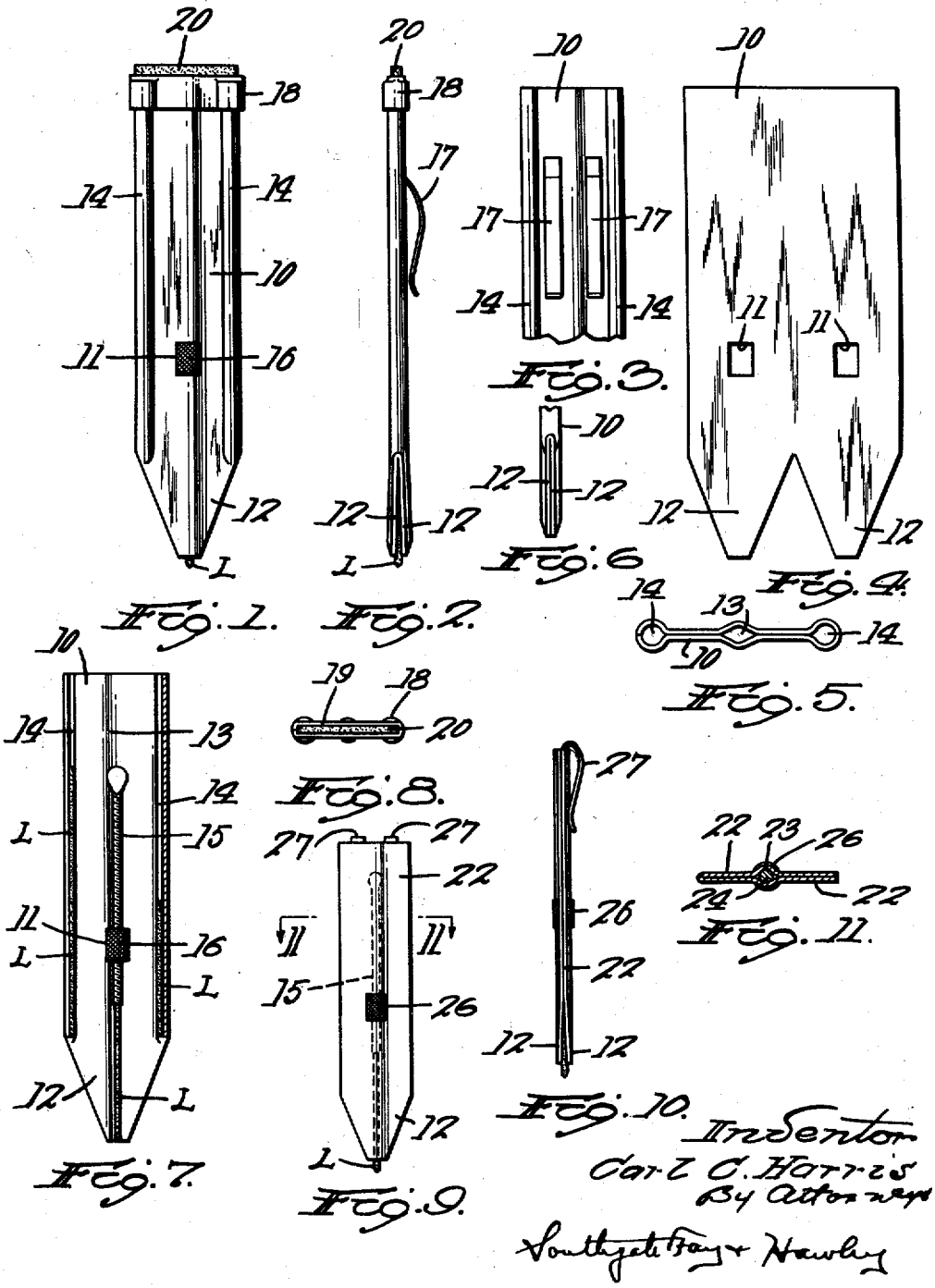
Inventor
Carl C. Harris
By Attorneys
Southgate Fay & Hawley Reissued Aug. 24, 1937

Re. 20,481

UNITED STATES PATENT OFFICE 20,481

PENCIL

Carl C. Harris, Orange, Mass.

Original No. 1,975,788, dated October 9, 1934, Serial No. 665,913, April 13, 1933. Application for reissue May 1, 1936, Serial No. 77,434

19 Claims. (Cl. 120—18)

This invention relates to a thin pencil or similar article as distinguished from the ordinary flat pencil having a flat wooden casing for the lead.

The principal objects of this invention are to provide a pencil which is much thinner than the said wood pencils, which can be carried in a book, such as a diary or the like, and can be used for attachment to a score card or pocketbook; to provide such a pencil to be used as a pocket pencil with a clip, of course, for holding it at the top of a pocket and having a certain flexibility, not enough to fracture the leads but sufficient to yield on impact against some object; to provide such a pencil with means for retaining extra leads without materially increasing the size of the pencil; to provide a casing for holding a lead, or other implement or tool, of any sheet material but preferably to cause it to be transparent so that the lead or tool can be seen; to provide means for feeding the lead or tool, which also will not result in any material increase in the thickness of the casing, and to provide the casing with a spring point sprung so that it will grip either a square or round lead at the point from which the lead emerges from the pencil.

Other objects and advantages of the invention will appear hereinafter.

Reference is to be had to the accompanying drawing, in which

Fig. 1 is a side view of a complete pencil constructed in accordance with this invention;

Fig. 2 is an edge view of the same;

Fig. 3 is a view of the side opposite that seen in Fig. 1;

Fig. 4 is a view of the blank of sheet celluloid or metal from which the casing is made;

Fig. 5 is a view of this sheet doubled on itself to practically form the complete casing of the pencil;

Fig. 6 is a view of the pencil point shown in Fig. 2 as it appears when the lead is not held by the resilient tips of that point;

Fig. 7 is a sectional view through the completed pencil showing the lead in position and the spare leads in the magazine therefor;

Fig. 8 is a plan of the cap with the eraser held therein;

Fig. 9 is a view similar to Fig. 1 showing a simpler form in which the invention can be carried out;

Fig. 10 is an edge view of the same, and

Fig. 11 is a section on the line 11—11 of Fig. 9.

I am aware of the fact that pencils have been made with a wooden casing of a flat shape so as to occupy less space than usual in one direction and to enable them to be placed in some positions in which the usual round or hexagonal pencils would produce a projection, as for example, pocket use. My idea, however, is to provide a real thin pencil having an attached clip for diary, score card and pocketbook use, the pencil being so thin that it can be closed up in an ordinary book without damaging the book or bending the back of the same.

For this purpose a thin sheet 10 of metal, or preferably transparent celluloid, is stamped out as shown in Fig. 4 with two rectangular openings 11 and two spaced points 12 and doubled on itself along the center in such a way as to provide a central longitudinal space 13 for the active lead and two side magazines 14 for spare leads. The opposite edges of the sheet are brought together and either left unattached or attached to each other in such a way that the two edges of the pencil will appear alike or finished. The pencil is made long enough for ordinary pocket use and the magazine 14 ordinarily in a pencil of medium length will have a capacity for a total of four extra lengths of lead.

In the center is arranged a left handed screw 15 with a flat end projecting into the converging sides of the passage 13 so that the screw cannot turn but can slide along the pencil. A nut 16 fitting the threads is placed in the opening formed by the two registering openings 11. Of course, the nut is placed in this space and started onto the screw in the course of manufacture and the lead is inserted below the end of the screw so that by turning the nut the lead will be forced out as shown in Figs. 1 and 2. This casing 10, being formed of sheet material, can be provided with a spring at the points 12 so that when the lead is turned out to active position as shown in Fig. 2, these points will be forced apart and their resiliency will be exerted on the lead to hold it firmly. Either a cylindrical or non-cylindrical lead can be employed because it has to be of no definite thickness or shape in order to cooperate with these two tips 12. When there is no lead in the pencil these tips spring together as shown in Fig. 6.

In this form of the invention, two metal clips 17 can be employed in the panels between the convex projections along the passage 13 and the magazines 14 constituting a very effective and convenient means for holding the pencil in a book or in a pocket.

An eraser is furnished by providing a cap 18 shaped inside like the exterior of the cross section of the pencil casing so as to fit thereover, made preferably of the same material and bent up by doubling from a straight sheet. This cap is provided with a cavity 19 in which a rubber eraser 20 is secured. This eraser can be held in place by the resiliency of the sheet material, it being strong enough to perform that function. The sheet material can be made comparatively thin on account of the three longitudinal strengthening ribs provided for forming the spaces 13 and 14.

The form of pencil described above is a convenient one and has the additional advantages of providing one or two magazines for extra leads but if it is desired to make the pencil simpler and less expensive one magazine can be eliminated or in fact the whole magazine idea. The pencil then can be made much more cheaply in the form shown in Figs. 9, 10 and 11. In this case there is no difference in the means for carrying and feeding the lead but the casing 22 is simply formed by doubling and leaving one passage 23 through it for the lead and the screw 24 which has a nut 26, as in the other case. Here the two edges are flat and in contact with each other throughout. A clip 27 is provided for the same purpose as the double clip in the other case or two clips can be used, if desired.

It will be seen that in this way a pencil is provided which is extremely thin and it really occupies a place not filled by the wooden casing pencils of flat shape. It can be placed, as stated, in a book without distorting the book and carried in the pocket conveniently without introducing even as much bulk as the usual wooden flat pencils. The lead is held effectively at the point and will not slip out and is not even likely to turn on its axis, when a cylindrical lead is used, by reason of this resilient gripping feature. The casing can be made flexible to as large an extent as may be desired by the quality and thickness of the sheet material used for it. Furthermore, when made of celluloid the point of lead is obvious, which is another advantage, although it can be made of other material without that advantage.

This invention can be used as a casing for a pencil lead or other small pocket implement. Instead of a lead the casing can carry adjustably a needle for picking slivers, a pair of tweezers, a file, a blackhead remover, or knife-blade.

Although I have illustrated and described only two forms of the invention I am aware of the fact that other modifications can be made therein by any person skilled in the art without departing from the scope of the invention as expressed in the claims. Therefore, I do not wish to be limited in this respect otherwise than as set forth in the claims, but what I do claim is:

1. As an article of manufacture, a casing formed of sheet material in a flat shape and having means therein for feeding a tool or the like, said sheet material being doubled on itself to form a single central space for the tool and feeding means and thin flat portions extending materially beyond said central space in two opposite directions.

2. As an article of manufacture, a pencil having a casing formed of two layers of thin sheet material separated from each other over a narrow area to provide a space for the lead and a parallel space constituting a magazine for extra leads.

3. As an article of manufacture, a pencil having a casing formed of two layers of thin material bowed out at the center in opposite directions to form a space for receiving lead and having yielding spring points adapted to come substantially into contact when no lead is in position to yieldingly grip the lead when it is in a position to project through the end of the pencil.

4. As an article of manufacture, a pencil comprising a casing consisting of two layers of sheet material in contact with each other convexed longitudinally along the center to provide a space inside for the lead and convexed longitudinally along both edges to provide magazines for leads.

5. As an article of manufacture, a lead pencil comprising a flat casing having a central space and a movable lead in said space extending to one end of the casing, said casing slanting back from said end to permit of the turning of the casing practically to an unlimited extent in all directions about the end of the lead projecting from the casing, said casing having a side space therein for a spare lead terminating at the end of the slanting surface.

6. As an article of manufacture, a casing formed of thin material in a flat shape and having means therein for feeding a lead or the like, said casing having a longitudinally extending space for the lead and feeding means, and thin flat portions extending materially beyond said space in the same plane.

7. As an article of manufacture, a substantially flat casing provided with a long narrow corrugation on each flat side positioned to oppose each other and thereby form a chamber within the casing for a lead, said corrugations each having an opening into said chamber, a nut in said openings accessible from the outside, and a propelling screw in said chamber extending through the nut to engage the lead.

8. As an article of manufacture, a pencil comprising a substantially flat casing expanded throughout its length but throughout only a small proportion of its width to receive a lead, a screw in the casing, where it is spread, in position to propel a lead, a nut on the screw for moving it longitudinally, said casing having an opening through which the nut projects, so that it can be turned from the outside to propel the lead.

9. As an article of manufacture, a pencil having a flat shaped body formed of thin material and having means thereon for feeding a lead or the like, said body comprising a longitudinally extending means for receiving the lead and feeding means, and a thin flat portion extending transversely from said receiving means.

10. As an article of manufacture, a pencil having a flat shaped body formed of thin material and having means thereon for feeding a lead or the like, said body comprising a longitudinally extending means for receiving the lead and feeding means, and a thin flat portion extending transversely from said receiving means, said feeding means comprising a rotary nut carried by said body in externally accessible position, and a propelling screw positioned in said receiving means and extending through said nut.

11. As an article of manufacture, a pencil having a casing formed with a space for receiving lead and having yielding spring points adapted to come substantially into contact when no lead is in position to yieldingly grip the lead when it is in a position to project through the end of the pencil.

12. As an article of manufacture, a thin mechanical pencil comprising a casing of thin material having substantially flat opposite sides formed to provide a longitudinal lead-receiving guideway, and lead-propelling means mounted in said guideway.

13. As an article of manufacture, a thin mechanical pencil comprising a casing of thin material having substantially flat opposite sides provided centrally of the width thereof with complementary longitudinal corrugations forming the lead-receiving guideway, and lead-propelling means mounted in said guideway.

14. As an article of manufacture, a thin mechanical pencil comprising a casing of thin material having substantially flat opposite sides provided centrally of the width thereof with complementary corrugations extending longitudinally of said casing and forming a lead-receiving guideway, lead-propelling means mounted in said guideway, and other complementary longitudinal corrugations in said flat sides adjacent the edges thereof acting to strengthen said casing.

15. As an article of manufacture, a mechanical pencil having a casing of thin transparent material formed to provide a longitudinal guideway to receive the lead, and lead-propelling means mounted in said guideway.

16. As an article of manufacture, a mechanical pencil comprising a thin flat tubular casing of thin transparent material having its opposite sides provided centrally of its width with complementary longitudinal corrugations forming a lead-receiving guideway, and lead-propelling means mounted in said guideway.

17. As an article of manufacture, a mechanical pencil comprising a thin substantially flat casing of resilient material having its opposite flat sides provided centrally of the width thereof with complementary longitudinal corrugations forming a lead-receiving guideway, rotatable lead-propelling means mounted in said guideway and having a head extending through oppositely disposed slots in said corrugations, and complementary longitudinal reenforcing corrugations adjacent the edges of said sides, whereby said pencil will have sufficient flexibility to yield upon impact of an object intermediate of its length, but will be of sufficient strength to resist breakage of the lead.

18. As an article of manufacture, a thin lead pencil comprising a tubular casing of thin material having substantially flat parallel sides with their edges near one end converging to provide a flat tapering section, complementary longitudinal corrugations in said sides extending through said tapering section and forming a lead-receiving guideway, and lead-propelling means mounted in said guideway.

19. As an article of manufacture, a thin lead pencil of substantially rectangular cross section comprising an integral tubular casing formed of thin metal of uniform thickness and having substantially parallel sides of uniform width with their edges near one end converging to provide a flat tapering section, complementary corrugations in said sides extending longitudinally centrally thereof and through said tapering section forming a lead-receiving guideway, said corrugations having oppositely disposed recesses at a distance from said tapering section, rotatable propelling means mounted in said guideway and having a head extending through the recesses in said corrugations adapted to be manually rotated.

CARL C. HARRIS.